Feb. 6, 1968  A. A. M. L. CAMBOULIVES  3,367,108
ARTICULATED CONNECTIONS FOR DUCTS
Filed June 8, 1966  4 Sheets-Sheet 1
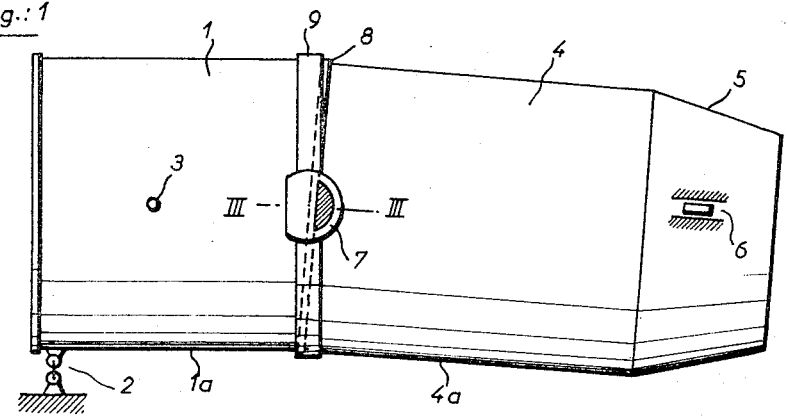
Fig.: 1
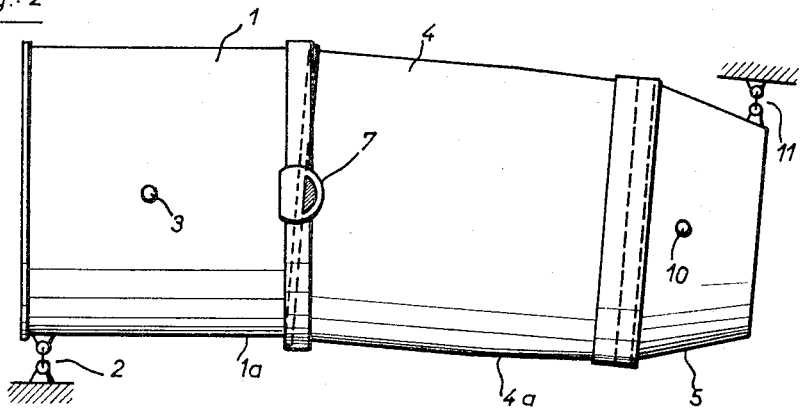
Fig.: 2
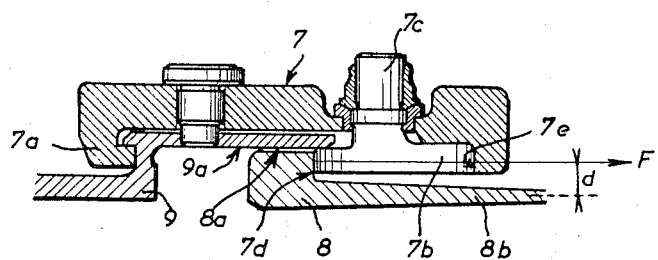
Fig.: 3

Feb. 6, 1968   A. A. M. L. CAMBOULIVES   3,367,108
ARTICULATED CONNECTIONS FOR DUCTS
Filed June 8, 1966   4 Sheets-Sheet 2
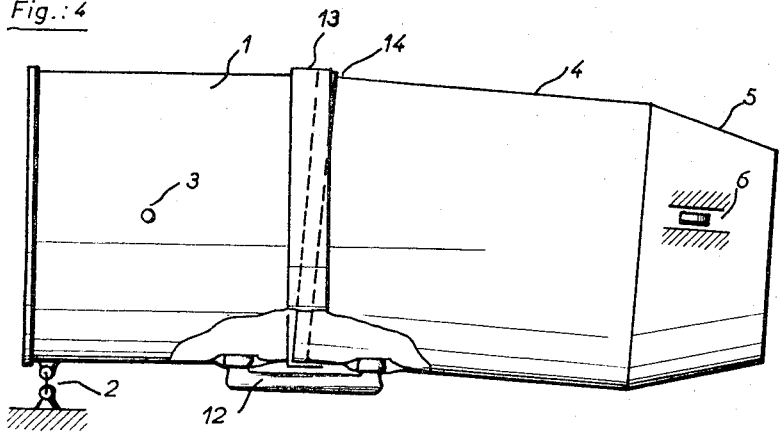
Fig.:4
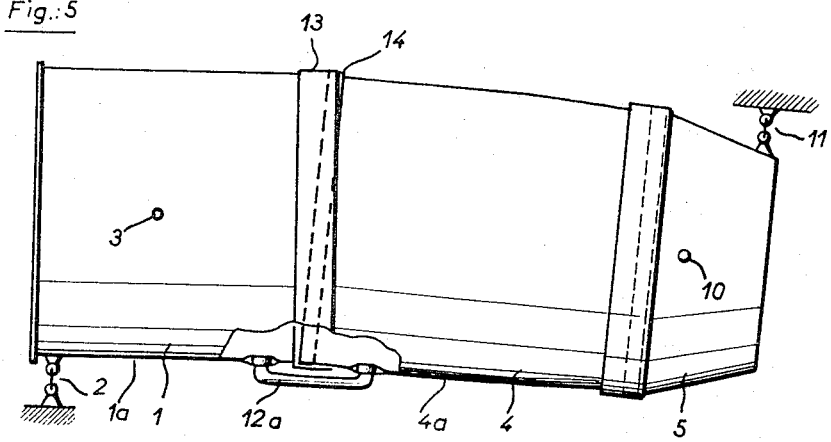
Fig.:5
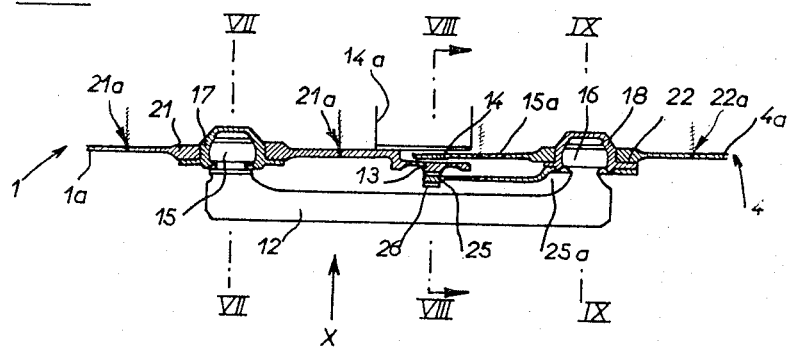
Fig.:6

United States Patent Office 3,367,108
Patented Feb. 6, 1968

3,367,108
ARTICULATED CONNECTIONS FOR DUCTS
Andre Alphonse Mederic Leon Camboulives, Billancourt, France, assignor to Societe Nationale d'Etude et de Construction de Moteurs d'Aviation, Paris, France, a company of France
Filed June 8, 1966, Ser. No. 556,114
Claims priority, application France, June 14, 1965, 20,685
7 Claims. (Cl. 60—39.32)

ABSTRACT OF THE DISCLOSURE

A plural duct arrangement wherein a plurality of duct sections are joined at their ends by means of a flexible joint which permits articulation of one duct section relative to the next adjacent duct section.

---

This invention relates to an articulated coupling for connecting one duct to another duct by means of a deformable or articulated joint, for example for mounting the elements, more especially the jet pipe, of a jet propulsion unit.

The fitting of a jet engine in an airframe sometimes requires that the connection between the engine and the jet pipe or afterburner reheat pipe be articulated.

In some cases, the engine proper is attached to the airframe independently of the jet pipes by means of an isostatic system that, without occasioning any drawbacks, makes allowance for deformations inherent in the operation of the engine and in the flight of the aircraft. The jet pipe, provided with its nozzle, is suspended at its rear from the airframe, and at its front is centered on and coupled to the rear of the engine by a semi-flexible joint.

In other cases, the jet pipe and the nozzle are independent of one another the engine and the nozzle, each being suspended in an isostatic manner from the airframe, as indicated above for the engine. Located between them and centered at its front on the engine and at its rear on the nozzle, the jet pipe or afterburner pipe is coupled to the engine by a semi-flexible joint.

These two cases are, however, only particular cases of the arrangement which consists in coupling the jet pipe to the rear of the engine by a semi-flexible joint in order to allow displacements of the suspension of the jet pipe to occur relative to that of the engine, without damage being caused. As coupling means in such an arrangement, use is generally made of two diametrically opposite connectors or trunnions which are attached to the downstream flange of the engine, which flange cooperates with the upstream flange of the jet pipe to form an articulated joint.

This arrangement has certain disadvantages which will be set out hereinafter with reference to FIGS. 1, 2 and 3 of the accompanying drawings. In particular, it sometimes happens that, following upon certain relative displacements of the suspensions, the jet pipe is only supported by a single connector. On the other hand, the stresses to be undergone by the coupling means make it necessary for the joint (generally of the swivel type) between the engine and the jet pipe, as well as the parts in the vicinity of these two elements, to be given a considerable degree of thickness, which makes the assembly heavier and brings about difficulties due to divergences of temperature in the joint.

The invention substantially avoids these disadvantages by allowing the function of the coupling means to be performed, completely separately from the function of the deformable joint.

In accordance with the present invention, the joint transmits no tractive force, and the coupling means is provided by an articulated device which permits relative angular movements of the jet pipe and of the engine and which bears on the wall of such pipe and on the wall of such engine, at one or more selected points, in such a manner that the tractive force it transmits does not apply any bending moment to said walls.

In one embodiment, this device comprises a rod which swivels on the walls of the engine and of the jet pipe at points located substantially at the centers of gravity of narrow cross sections of portions of said walls (in the form, for example, of circular arcs) which are to be utilized for the transmission of forces. If the jet pipe is to be able to incline relative to the engine in every direction, the coupling device is preferably constituted by a single rod articulated by means of swivel elements, the articulated joint itself being of the swivel type.

The following description, having regard to the accompanying drawings and given by way of non-limitative example, will bring out the various features of the invention and the manner of putting them into effect, every arrangement emerging both from the text and from the drawings naturally falling within the scope of said invention.

In the drawings:

FIGS. 1 and 2 are diagrammatic views in longitudinal elevation of an engine, with its jet pipe and its nozzle, showing a coupling device of known type employing a connector, in two cases each of which involve the suspension of the nozzle.

FIG. 3 is a partial half-section taken on line III—III in FIG. 1, drawn to a larger scale and for illustrating the disadvantages of this known coupling device.

FIGS. 4 and 5 are views respectively analogous to FIGS. 1 and 2, showing diagrammatically a coupling device according to the invention.

FIG. 6 is a partial half-section, drawn to a larger scale, showing the coupling device and the joint between the engine and the jet pipe.

Figure 7:
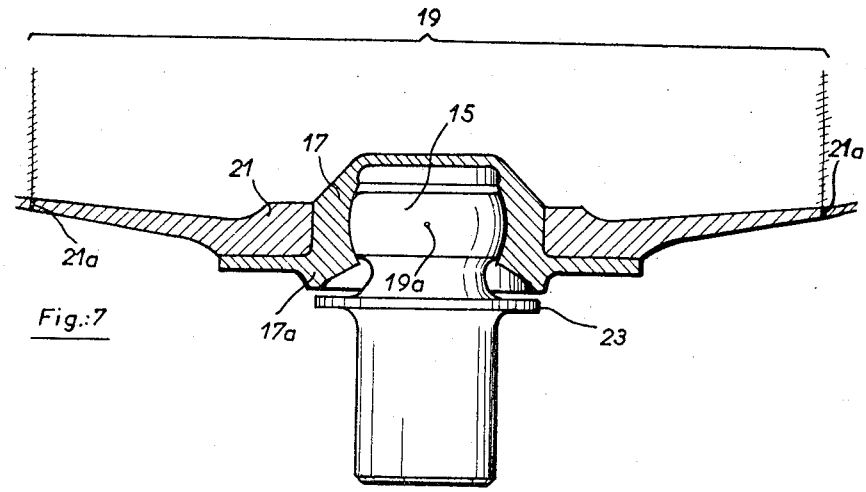
FIGS. 7, 8 and 9 are partial sections, drawn to a still larger scale, on lines VII—VII, VIII—VIII and IX—IX respectively of FIG. 6.

In FIG. 1 is shown the terminal portion of a jet propulsion unit, the engine of which is attached to the aircraft's frame by an isostatic suspension indicated diagrammatically at 2 and 3. Said suspension is isostatic in that it allows the displacement of the mountings 2 and 3 without the suspended unit, here the engine, undergoing deformation. The jet pipe 4, rigid with the nozzle 5, is suspended from the airframe, at the rear, by an arrangement of two diametrically opposite sliding rollers 6 which allow the jet pipe to turn about its axis. The coupling of the jet pipe 4 to the engine 1 is effected in a known manner by two diametrically opposite connectors 7 that link the upstream flange 8 on the jet pipe to the downstream flange 9 on the engine, the connectors 7 spanning these two flanges. FIG. 3 shows in greater detail one known arrangement of one of these connectors 7. The front edge 7a of such connector 7 bears on the downstream flange 9 of the engine and at its rear such connector carries a shoe or abutment element 7b which can swing about its axis 7c. The shoe 7b bears at 7d on the upstream flange 8 of the jet pipe and has a semi-circular rear edge 7c which bears on the connector. The arrangement of FIGS. 1 and 3 illustrates the case of a suspension as first mentioned in the preceding introduction. One such connector system is described in detail in the present applicants' U.S. patent specification No. 435,855.

A suspension according to the second case above-mentioned is shown in FIG. 2, in which the engine 1 is again suspended in an isostatic manner at 2 and 3, but the nozzle 5 is independent of the jet pipe 4, said nozzle 5 being attached to the airframe by an isostatic suspension represented diagrammatically at 10 and 11. The jet pipe 4, centered at its rear on the nozzle (and fitting into the latter so as to be able to slide and to turn about its axis) and centered at its front on the engine, is coupled to the latter by connectors 7 generally similar to that shown in FIG. 3.

These arrangements, as also other known arrangements in which the semi-flexible articulation of the jet pipe or afterburner pipe to the engine is effected with the assistance of connectors, possess more especially the following disadvantage: if the jet pipe is not free to move in the diametrical plane containing the two connectors, as is frequently demanded by the structure of the aircraft, the system of forces that arises in the coupling is hyperstatic and one of the two connectors obviously bears more load than the other. It may even occur, if the deformations in the airframe under certain flight conditions are excessive, that the jet pipe is supported by one connector only.

Furthermore, as will be seen in FIG. 3, the articulation of the jet pipe on the engine is effected by a swivel joint formed by the cooperation of the inner surface 9a of the flange downstream of the engine with the outer surface 8a of the upstream flange of the jet pipe, and it is necessary that said swivel joint should be as leakproof as possible so as to restrict the leakage of gas. This condition leads, in particular, to the desirability of making the parts constituting the swivel joint with a radial thickness that is as small as possible, so that in use divergence in temperature between the female part 9 and the male part 8 should be as little as possible. From this point of view, the ideal structure of the joint, such as is necessary to bring into being the articulation, is the one which most closely approaches a simple wall not possessing a joint. It is obvious, in fact, that if the divergence in temperature between the two parts in question is substantially nil, there is no need to provide between them a degree of play that will permit radial dilation of the male part, theoretically hotter than the female unit in use. Coupling means employing connectors do not permit such an arrangement, since as the connectors bear on the male flange 8 and the female flange 9, these parts consequently must possess quite a considerable radial thickness, as necessary to transmit the forces arising.

If the letter F (FIG. 3) is used to designate the force applied by the shoe 7b to the flange 8 of the jet pipe and the letter d is used to designate the distance of said force F from the neutral axis of said jet pipe, it will also be seen that the force transmitted by the connector introduces a bending couple $F \times d$ into the connecting wall 8b and into the wall 4a of the jet pipe. In order to balance this couple, not only must the section of the male and female flanges be increased, which accentuates the disadvantages described above, but also the thickness of the connecting wall 8b and that of the wall 4a belonging to the jet pipe must be increased, thus disadvantageously adding to the weight of the assembly.

The coupling device according to the invention, as shown in FIGS. 4 to 10, substantially avoids these disadvantages. FIG. 4 shows diagrammatically the application of the coupling device according to the invention to the case of a suspension as first mentioned in the introduction above. The engine 1 is attached to the airframe by an isostatic suspension 2, 3. The jet pipe 4, rigid with the nozzle 5, is suspended towards its rear at 6, as has already been explained with reference to FIG. 1. The swivel joint between the engine 1 and the jet pipe 4, as shown diagrammatically by the flanges 13 and 14, and the coupling of the jet pipe 4 to the engine 1, as represented diagrammatically by a rod 12, are shown in greater detail in FIGS. 6 to 9. FIG. 5 shows diagrammatically the application of the coupling device according to the invention, as shown by a rod 12a, to the case of a suspension, mentioned second in the introduction above, in which the nozzle 5 is independent of the jet pipe 4 and is attached to the airframe by an isostatic suspension 10, 11, the jet pipe 4 swivelling at 13, 14 and being coupled at 12a to the rear of the engine 1, which is attached to the airframe by the isostatic suspension 2, 3.

The device for articulating and coupling the jet pipe to the engine should, like the above-described device using connectors 7 make due allowance for—

The possibility of inclination of the axis of the jet pipe with respect to that of the engine, The possibility of rotation of the jet pipe 4 about its axis, with respect to the engine (FIG. 4) or with respect to the nozzle (FIG. 5), The force generated by the pressure prevailing within the jet pipe 4, more especially when it is a jet pipe fitted with an afterburner or reheat device, The inertial force in the jet pipe 4 upon acceleration of the aircraft.

The articulation and coupling device in FIGS. 6 to 9 fulfills these conditions. Thus, in this device, the articulation of the jet pipe on the engine, which is effected by the swivel joint formed by the cooperation of the downstream flange 13 of the engine with the upstream flange 14 of the jet pipe, is separated from the force-transmitting means coupling the jet pipe to the engine, which is effected by the rod 12. This arrangement gives the swivel joint the best conditions possible for reducing gas leakages, more especially by allowing the radial thicknesses of the flanges 13 and 14 to be kept small, and it allows the forces from the jet pipe 4 to be transmitted to the engine 1 without causing bending in the connecting walls 25a or in the wall 4a of the jet pipe 4. Thus, the bending stresses pass solely into the rod 12, and the latter constitutes a beam of which it is easy to fix the dimensions so that it will easily withstand said bending stresses. On its inner side the joint is provided with a flap 14a forming a joint-cover.

In order to avoid bending in the connecting wall 15a, or in the wall 4a of the jet pipe 4, the line of action of the jet force applied to such wall must pass into the wall or into the vicinity thereof. With this in view, the rod 12 carries at each end a swivel element 15, 16 offset towards the inside, so that the rod 12 forms a bridge over the swivel joint 13, 14. The swivel elements 15 and 16 cooperate respectively with swivel element housings 17, 18 respectively attached to the wall 1a of the engine 1 and to the wall 4a of the jet pipe 4. The centers of the swivel elements 15 and 16 are located respectively at the centers of gravity 19a and 20a of those cross-sectional portions 19, 20 (in the general form of circular arcs) of the walls 1a and 4a of the engine and the jet pipe respectively which it is desired to involve in the transmission of forces. Said circular arcs 19, 20 are bounded by brackets in FIGS. 7 and 9 respectively and are represented, seen as if cut through, by dotted lines in FIG. 10, in which also are shown diagrammatically, in dash-dot form, the lines of main constraint 19b and 20b, respectively in the wall 1a of the engine and in the wall 4a of the jet pipe, which make possible the bounding of said arcs.

In the embodiment described above, each of the swivel element housings 17, 18 is centered in a boss 21, 22 of annular form, butt-welded at 21a, 22a respectively to the wall 1a of the engine and the wall 4a of the jet pipe. Said bosses provide the best solution for passing forces into the walls, in a homogeneous manner, from the point 19a or 20a. At one of the ends of the rod 12 there is provided a device that prevents rotation of such rod about the axis passing through the centers 19a and 20a of the two swivel elements. In the embodiment shown, said device comprises a shoulder 23 on the rod which is designed to bear on a collar 17a on the swivel-element housing 17 (FIG. 7).

Figure 11:
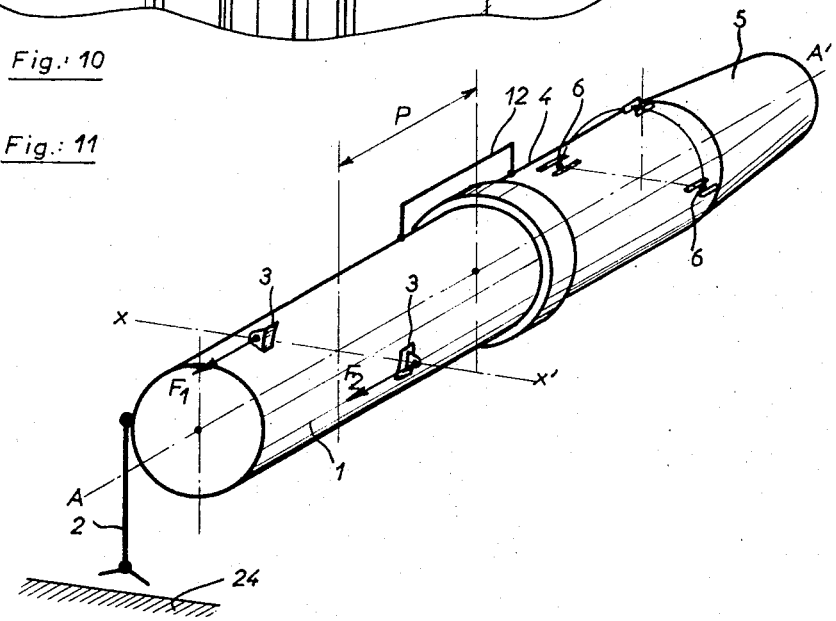
FIG. 11 is a diagrammatic view in perspective showing a variation of the arrangement of FIG. 4.

The rod 12 may be arranged at any position around the periphery of the engine and the jet pipe, but it will preferably be located in the vertical plane passing through the axis of the engine, in the bottom portion or the top portion according to accessibility in the aircraft, and perpendicularly to the horizontal axis passing through the suspension trunnions 3 of the engine, so that reaction forces applied to said trunnions may be equal. The rod 12 is thus arranged low down in FIG. 4 and high up in FIG. 11. In the latter figure, there is shown at A, A' the longitudinal axis of the engine, and at P the vertical plane passing through said axis and containing the rod 12, said plane P being perpendicular to the axis $x, x'$ passing through the trunnions 3a, so that the reaction forces $F_1$ and $F_2$ applied to the latter are equal. In the embodiment of FIG. 11, the rotation couple about the axis $x, x'$, produced by the force transmitted by the rod 12, is balanced by a rod 2 tangential to the outer diameter of the engine 1 and attached to the nacelle 24 of the aircraft as are the trunnions 3. In FIG. 11, said rod 2, is arranged to the rear of the trunnions 3, but it could equally well be placed in front thereof. The trunnions 3 and the rod 2 together form the isostatic suspension mentioned above.

Figure 8:
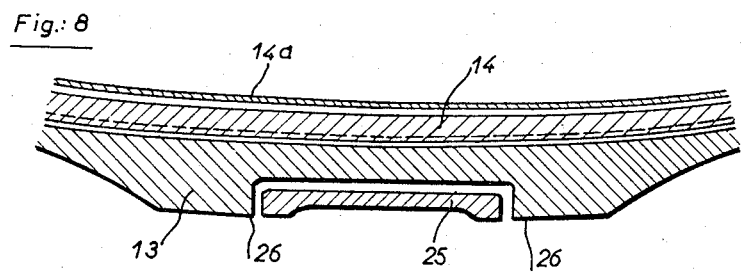
Figure 9:
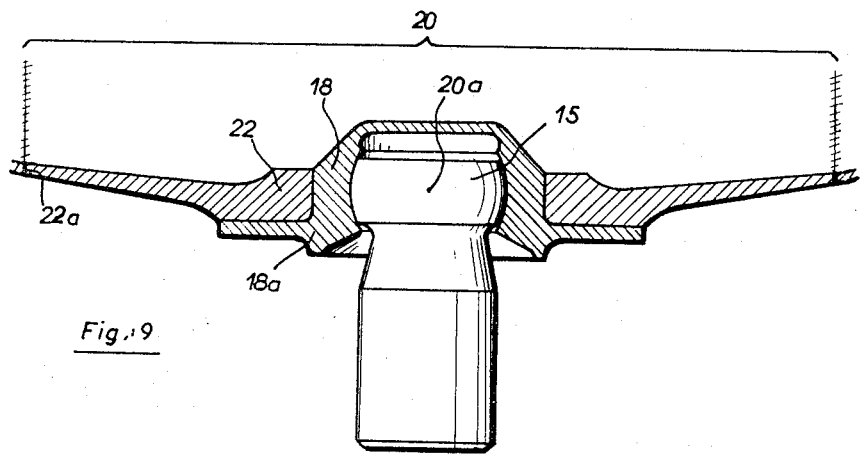
Figure 10:
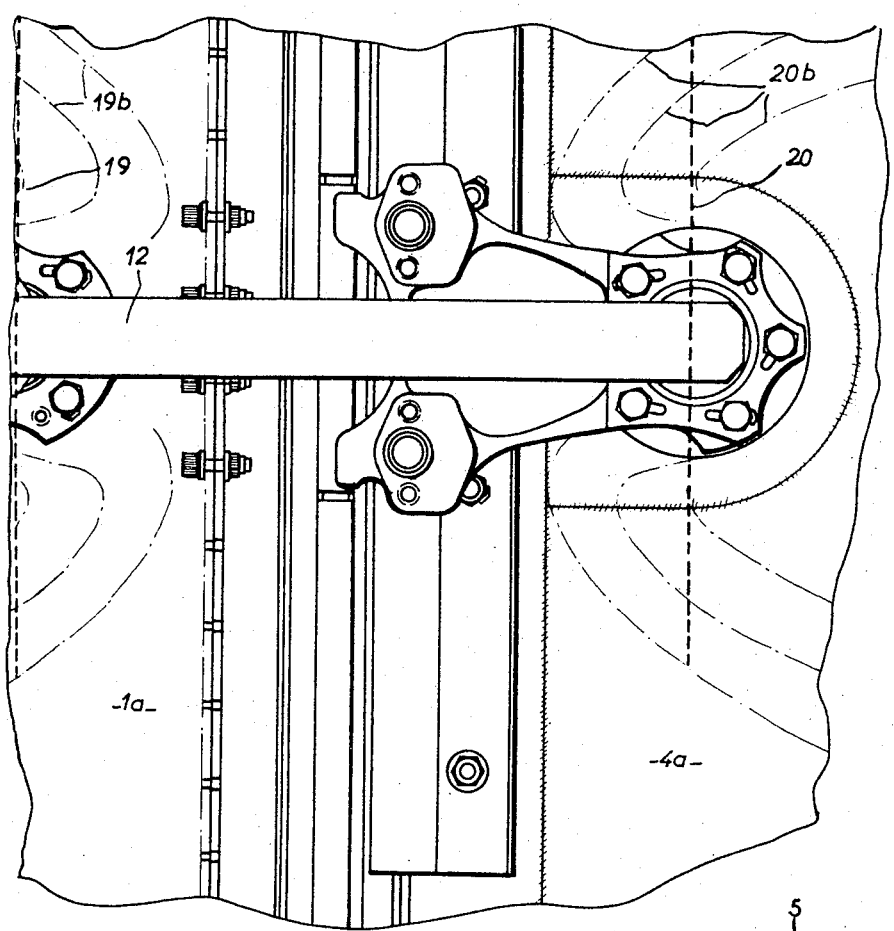
FIG. 10 is a partial plan view, shown from below, according to the arrow X in FIG. 6.

It will be noted that in the case of the suspension in FIG. 5, since the jet pipe 4 is independent of the nozzle 5 and is coupled to the engine 1 by means of the articulated rod 12a, it is necessary to provide a device that will prevent the rotation of the jet pipe relatively to the engine, said pipe being permitted to turn about its axis solely with respect to the nozzle 5. As shown in FIGS. 6 and 8, such device comprises a stop 25 secured at 25a to the swivel element housing 18 associated with the jet pipe 4, said stop 25 bearing against steps 26 provided in the female part of the swivel joint 13, 14, which part is rigid with the engine 1. Said stop 25 thus bears perpendicularly to the axis of the jet pipe 4, in the diametrical plane of the swivel joint 13, 14.

The stop 25 should natuarally be omitted in the case of the suspension of FIGS. 4 and 11, since the jet pipe 4 is then rigid with the nozzle 5 and must be able to turn about its axis relatively to the engine.

It goes without saying that the embodiments described are examples only and that they may be modified, more especially by substituting equivalent technical means, without however thereby going beyond the scope of the invention as defined in the appended claims. In particular, the swivel joint 13, 14 may be replaced by another type of articulated or deformable joint, for example a cup and ball joint in the case in which the axis of the jet pipe can only incline in one plane relatively to the axis of the engine, said articulated or deformable joint playing no part in the transmission of forces, which is ensured by the coupling means. In place of a single rod such as 12, the coupling means may comprise a plurality of rods, for instance two. The swivelling element at 15 and 16 may be replaced by other articulated devices, for example universal joints.

The scope of the invention defined in the accompanying claims would not be overstepped, either, by the employment of any other type of articulated coupling means that directly transmits the forces from the wall of the jet pipe to that of the engine, wihout the joint between the engine and the jet pipe transmitting any force and preferably without bringing about any bending moment in said walls.

What is claimed is:

1. A plural duct arrangement comprising first and second duct sections which are separately suspended from a support, means providing a flexible joint between said duct sections, and at least one connector member which straddles said means, the connector member being pivotably mounted in a wall of each of the first and second duct sections.

2. A plural duct arrangement according to claim 1, wherein said means provide a swivel joint, and comprising a single said connector member swivelly mounted in a wall of each of the first and second duct sections.

3. In a jet aircraft, an arrangement for mounting on the airframe a jet propulsion unit having a first duct section integral with an engine portion of the unit, and a second duct section forming a jet pipe and a nozzle for the unit; comprising isostatic suspension means for suspending the first duct section from the airframe; joint means providing a swivel joint between a rear portion of the first duct section and a front portion of the second duct section; a connector member which straddles the joint means and is swivelly mounted in a wall of each of the first and second duct sections; and means for suspending a rear portion of the second duct section pivotally and slidably to the airframe.

4. A mounting arrangement according to claim 3, in which the isostatic suspension means comprise a pair of diametrically opposite trunnions, and the connector member is located substantially in a plane that contains the longitudinal axis of the first duct section and that is perpendicular to the axis of the trunnions.

5. In a jet aircraft, an arrangement for mounting on the airframe a jet propulsion unit having a first duct section integral with an engine portion of the unit, a second duct section forming a jet pipe for the unit, and a nozzle; comprising first isostatic suspension means for suspending the first duct section to the airframe; joint means providing a swivel joint between a rear portion of the first duct section and a front portion of the second duct section; a connector member which straddles the joint means and is swivelly mounted in a wall of each of the first and second duct sections; means for slidably and pivotally connecting a rear portion of the second duct section to the nozzle; and second isostatic suspension means for suspending the nozzle to the airframe.

6. A mounting arrangement according to claim 5, comprising first and second stop means rigid with the first and second duct sections, respectively, the said stop means being adapted to bear against each other perpendicularly to the axis of the second duct section in a plane that is diametral to the swivel joint, so as to prevent rotation of the second duct section about its axis relatively to the first duct section.

7. A mounting arrangement according to claim 5, in which the first isostatic suspension means comprise a pair of diametrically opposite trunnions, and the connector member is located substantially in a plane that contains the longitudinal axis of the first duct section and that is perpendicular to the axis of the trunnions.

References Cited

UNITED STATES PATENTS

| | | | |
|---|---|---|---|
| 1,957,761 | 5/1934 | Cushing | 285—261 |
| 2,580,207 | 12/1951 | Whittle | 60—39.32 |
| 2,604,339 | 7/1952 | Kaysing et al. | 285—261 |
| 3,064,419 | 11/1962 | Ward | 285—116 X |

CARLTON R. CROYLE, *Primary Examiner.*